(12) United States Patent
Lemaire et al.

(10) Patent No.: US 8,491,790 B2
(45) Date of Patent: *Jul. 23, 2013

(54) METHOD FOR THE DIRECT ELUTION OF REACTIVE 18F FLUORIDE FROM AN ANION EXCHANGE RESIN IN AN ORGANIC MEDIUM SUITABLE FOR RADIOLABELLING WITHOUT ANY EVAPORATION STEP BY THE USE OF STRONG ORGANIC BASES

(75) Inventors: Christian Lemaire, Alleur (BE); Samuel Voccia, Liège (BE); Joël Aerts, Durbuy (BE); André Luxen, Ocquier (BE); Jean-Luc Morelle, Liège (BE); Gauthier Philipart, Grand-rechain (BE)

(73) Assignees: Trasis S.A., Liège (BE); Universite de Liège, Liège (BE)

( * ) Notice: Subject to any disclaimer, the term of this patent is extended or adjusted under 35 U.S.C. 154(b) by 625 days.

This patent is subject to a terminal disclaimer.

(21) Appl. No.: 12/664,615

(22) PCT Filed: Jul. 1, 2008

(86) PCT No.: PCT/BE2008/000048
§ 371 (c)(1),
(2), (4) Date: Apr. 21, 2010

(87) PCT Pub. No.: WO2009/003251
PCT Pub. Date: Jan. 8, 2009

(65) Prior Publication Data
US 2010/0196254 A1    Aug. 5, 2010

Related U.S. Application Data

(60) Provisional application No. 60/947,621, filed on Jul. 2, 2007.

(30) Foreign Application Priority Data

Nov. 20, 2007 (EP) .................................. 07447064

(51) Int. Cl.
*B01D 15/08* (2006.01)

(52) U.S. Cl.
USPC ........ 210/635; 210/656; 210/682; 210/198.2; 424/1.89

(58) Field of Classification Search
USPC ....... 210/635, 656, 659, 682, 198.2; 424/1.89
See application file for complete search history.

(56) References Cited

U.S. PATENT DOCUMENTS 8,206,571 B2 * 6/2012 Clarke .......................... 205/350
8,206,593 B2 * 6/2012 Lee et al. ...................... 210/640

(Continued)

FOREIGN PATENT DOCUMENTS

| CN | 1887829 | 1/2007 |
| WO | WO 94/21653 | 9/1994 |

(Continued)

OTHER PUBLICATIONS

Cogneau et al., "Production of a high purity 18F radioactive beam," *Nuclear Instruments and Methods in Physics Research* (1999) A420: 489-493.

(Continued)

*Primary Examiner* — Ernest G Therkorn
(74) *Attorney, Agent, or Firm* — Merchant & Gould P.C.

(57) ABSTRACT

A method to extract out of an aqueous solution, concentrate and/or reformulate [18F] fluorides without any evaporation step wherein the eluting solution is a organic solution having a water content <3%. The solution contains at least: an organic solvent suitable for the subsequent radiolabelling reaction; a first compound (A) which is a molecule containing at least one acidic hydrogen and a second compound (B) which is an organic base sufficiently strong to be able to tear off the acidic hydrogen of the first compound (A) in an acid-base reaction leading to the formation of an organic salt (S).

17 Claims, 1 Drawing Sheet

U.S. PATENT DOCUMENTS

| | | | | |
|---|---|---|---|---|
| 2007/0071671 | A1* | 3/2007 | Hirano | 424/1.11 |
| 2008/0281090 | A1* | 11/2008 | Lee et al. | 536/122 |
| 2009/0242421 | A1* | 10/2009 | Clarke | 205/350 |
| 2009/0277804 | A1* | 11/2009 | Clarke | 205/742 |
| 2010/0196254 | A1* | 8/2010 | Lemaire et al. | 423/501 |
| 2011/0006011 | A1* | 1/2011 | Aerts et al. | 210/682 |

FOREIGN PATENT DOCUMENTS

| | | |
|---|---|---|
| WO | WO 2006/065038 A1 | 6/2006 |
| WO | WO 2008/101305 A1 | 8/2008 |

OTHER PUBLICATIONS

Muller, P., "Glossary of terms used in physical organic chemistry," IUPAC *Pure & Appl. Chem* (1994) 66(5): 1077-1184.

Jewett et al., "Extraction of [18F]Fluoride from [18O]Water by a fast fibrous anion exchange resin," *Appl. Radiat. Isot.* (1990) 41 (6): 583-586. XP002472191.

Kim et al., "A new class of SN2 reactions catalyzed by protic solvents: Facile fluorination for isotopic labeling of diagnostic molecules," *JACS* (2006) 128 (50): 16394-7.

Mukhopadhyay et al., "Radiosynthesis of 2'-deoxy-2'[18F]-fluoro-5-methyl-1-β-L-arabinofuranosyluracil ([18F]-L-FMAU) for PET," *Applied Radiation and Isotopes* (2007) 65: 941-946.

Vasdev et al., "Syntheses and in vitro evaluation of fluorinated napthoxazines as dopamine D2/D3 receptor agonists: radiosynthesis, ex vivo biodistribution and autoradiography of [18F]F-PHNO," *Nuclear Medicine and Biology* (2007) 34: 195-203.

Coenen et al., "Preparation of N.C.A. [17-18F]-fluoroheptadecanoic acid in high yields via amniopolyehter supported, nucleophilic fluorination," *Journal of Labelled Compounds and radiopharmaceuticals* (1986) XXII (5): 455-467.

Alexoff et al., "Recovery of [18F]Fluoride from [18]Water in an Electrochemical Cell," *Appl. Radiat. Isot.* (1989) 40 (1): 1-6.

* cited by examiner

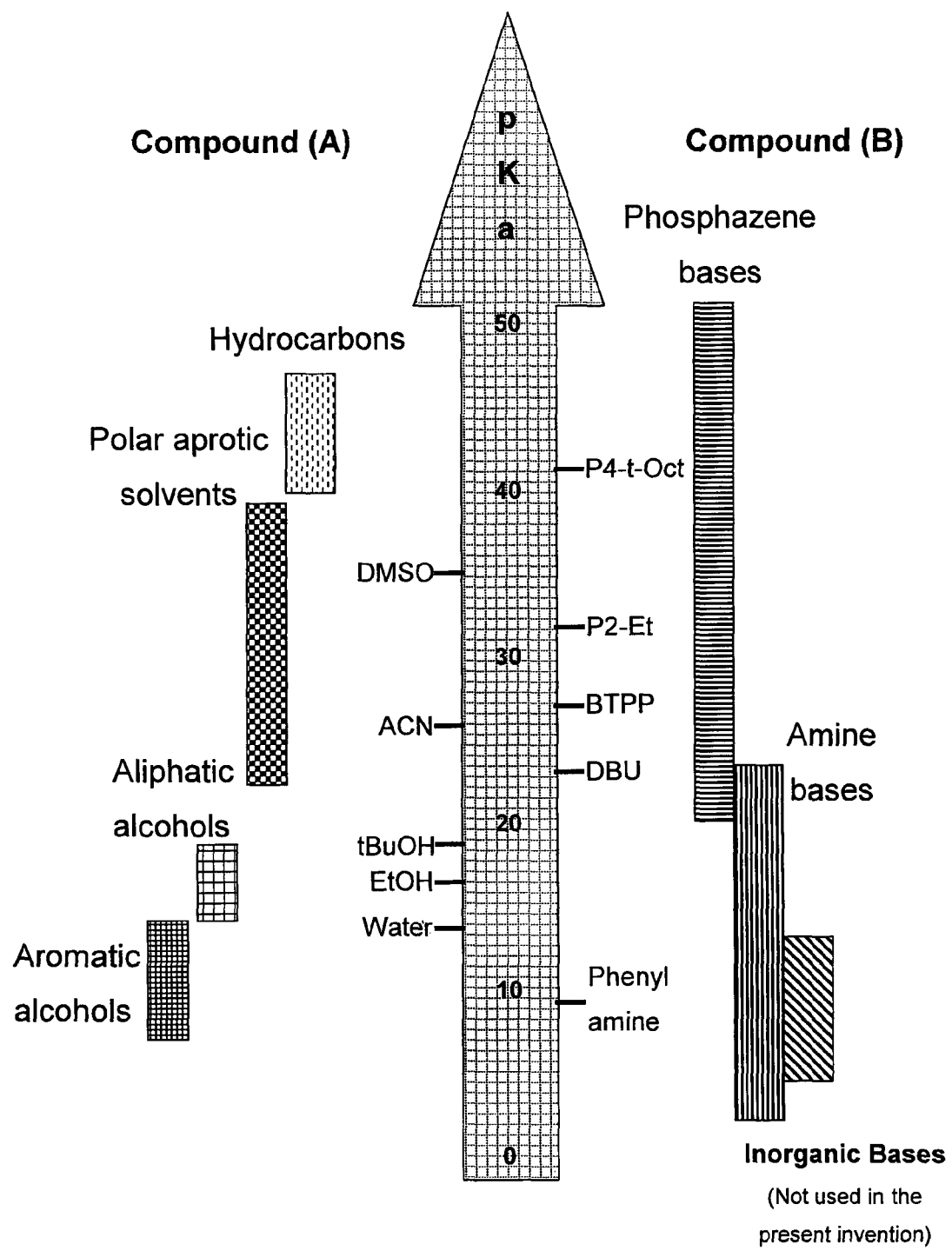

METHOD FOR THE DIRECT ELUTION OF REACTIVE 18F FLUORIDE FROM AN ANION EXCHANGE RESIN IN AN ORGANIC MEDIUM SUITABLE FOR RADIOLABELLING WITHOUT ANY EVAPORATION STEP BY THE USE OF STRONG ORGANIC BASES

This application is a National Stage Application under 35 USC 371 of PCT/BE2008/000048, filed Jul. 1, 2008, which claims priority to Ser. No. 07447064.2, filed Nov. 2, 2007 in the EPO, and which also claims the benefit of Ser. No. 60/947,621, filed Jul. 2, 2007 in the United States and which applications are incorporated herein by reference. To the extent appropriate, a claim of priority is made to each of the above disclosed applications.

TECHNICAL FIELD

The present invention relates to methods for the preparation of reactive [18F]fluoride in a form suitable for efficient radiolabelling without an evaporation step by the use of an anion exchange resin and strong organic bases.

BACKGROUND ART

[18F]fluoride is produced by irradiation of water, containing $H_2^{18}O$, with protons resulting in the reaction $^{18}O(p,n)^{18}F$. Only a minor fraction of the [18O] is converted. The [18F] isotope is then separated from the water and processed for production of a radio-pharmaceutical agent.

In the current practice, fluoride recovery is based on the use of an anion-exchange resin. The recovery is carried out in two steps, extraction and elution: first the anions (not only fluoride) are separated from the enriched [18O]water and trapped on the said resin (Coenen et al., J. Labelled Compd. Radiopharm., 1986, vol. 23, pp. 455-467). The anions, including [18F]fluoride, are then eluted into a mixture containing water, organic solvents, an activating agent or phase transfer agent or phase transfer catalyst, such as for example the complex potassium carbonate-Kryptofix 222 ($K_2CO_3$-K222) or a tetrabutylammonium salt. The [18F]fluoride radiochemical recovery yield is very effective, usually exceeding 99%.

The most usual labelling method, known as nucleophilic substitution, requires anhydrous or very low water content solutions. Thus, an evaporation step (or drying step) is still necessary after [18F]fluoride recovery to remove the excess water. It usually consists in multiple azeotropic evaporations with acetonitrile or low boiling temperature organic solvent. Such evaporations require several minutes (Schlyer et al., Appl. Radiat. Isot., 1990, vol. 40, pp. 1-6).

The current trend in the automation of the preparation of radiopharmaceuticals for medical imaging is to develop "Lab-on-chip" devices. The aforementioned evaporation step is very difficult to implement within such a "Lab-on-chip" device.

In document D. M. Jewett et al, *Extraction of [$^{18}F$]Fluoride from [$^{18}O$] Water by a Fast Fibrous Anion Exchange Resin*, Radiat. Isot. Vol. 41, No. 6, pp. 583-586, 1990, [$^{18}F$] fluoride for nucleophilic radiofluorination was recovered from target water by trapping on a fibrous anion exchange resin in the hydroxide form and subsequent displacement into wet methanolic $K_2CO_3$. Extraction into methanol facilated rapid evaporation and resolubilization in the [$^{18}F$]fluoride as an ion pair.

Document CN 1 887 829 A discloses, in the field of chemical synthesis, a process for synthesizing [$^{18}F$] labeled positive electron radioactive tracer with ionic liquid as phase transfer catalyst. The process includes the following steps: 1. transferring [$^{18}F$] ion from cyclotron to accepting bottle and leading to anion exchange column; 2. eluting [$^{18}F$] ion in the column with alkaline weak acid salt, acetonitrile and ionic liquid, and conveying to reactor bottle; 3. dissolving the precursor in acetonitrile, adding to the reactor bottle and heating; 4. cooling and regulating pH value; and 5. separating and collecting the target product from the solution.

AIMS OF THE INVENTION

The current invention aims at avoiding the need for any evaporation after the elution of the anion-exchange resin.

Further the invention aim to reduce the preparation duration, which results in an increase of the overall radiochemical yield.

A still further aim of the invention is to simplify the automated radiosynthesis equipment used for the synthesis of a radiotracer.

Further the invention aims at making the method suitable for implementation into automated "Lab-on-chip" systems.

The current invention aims also at allowing the radiolabelling of very sensitive compounds at lower temperatures than those used by the method of the prior art, especially at room temperature.

BRIEF DESCRIPTION OF THE DRAWINGS

FIG. 1 shows the hydrogen acidity scale for first compound (A) and basicity scale for second compound (B).

DISCLOSURE OF THE INVENTION

The method of the invention allows the preparation of a reactive [18F]fluoride solution for nucleophilic substitution reactions on both aliphatic and aromatic precursors, without any azeotropic evaporation step. Moreover, the invention allows the resulting [18F]fluoride ions to be highly reactive even at temperature as low as room temperature. It brings two advantages: the reduction of the preparation duration, which results in an increase of the overall yield, and a simplification of the automated equipment needed for the synthesis of a radiotracer. In particular, the suppression of any azeotropic evaporation step facilitates the implementation of the synthesis on microfluidic devices such as "lab-one-chip" in which these evaporations are difficult to perform. Moreover, the high reactivity of the resulting fluoride ions even at low temperature and the suppression of the evaporation step, both allow the labelling of temperature sensitive precursors, which was not possible in the current practice conditions.

Moreover, it must be noted that, according to the invention, both the elution and the radiolabelling are performed with an "all organic" solution, thus, in the total absence of any inorganic bases or salts such as the one used in the methods of prior art.

According to the invention, the eluting medium or solution is an organic solution containing at least the following species: an organic solvent suitable for a subsequent radiolabelling reaction, i.e. a polar aprotic solvent, a first compound (A) which is a molecule that contains a least one acidic hydrogen and a second compound (B) that is an organic base sufficiently strong to be able to tear off the acidic hydrogen of first compound (A) in an acid-base reaction, which leads to the formation of an organic salt (S).

The occurrence of this acid-base reaction is related to the pKa of the acid hydrogen of first compound (A) and the pKA of the conjugated acid of the basic second compound (B), the one of the first compound (A) has to be lower than the one of conjugated acid of the second compound (B). The elution process is made possible by the combined effects of this organic salt (S), which brings anions that can exchange with the fluoride trapped on the resin and cations that allows the fluoride to be solubilized in the eluting medium, and by the excess of first compound (A) or second compound (B), which may enhance the solvation of the ions in the organic medium. The smaller the anion of said organic salt (S) and the more the negative charge is localized on this anion, the more this anion exchange process that allows the release of the [18F] activity from the anion exchange resin is efficient. The resulting organic salt (S) is thus acting as an activating agent or phase transfer agent or phase transfer catalyst.

Organic solvents suitable for radiolabelling, i.e. polar aprotic solvents, are organic solvents that have dipoles due to polar bonds, don't have H atoms that can be donated into a H-bond and in which anions are not solvated but are "naked" which allows them to be reactive as nucleophile for substitution reactions. These solvents are defined by the IUPAC (IUPAC, 1994, 66, 1077 (Glossary of terms used in physical organic chemistry (IUPAC Recommendations 1994)) on page 1106) as: "solvents with a comparatively high relative permittivity (or dielectric constant), greater than ca. 15, and a sizable permanent dipole moment, that cannot donate suitably labile hydrogen atoms to form strong hydrogen bonds, e.g. dimethyl sulfoxide, . . . . Such solvents are usually not aprotic but protophilic (and at most weakly protogenic) . . . ".

Chemicals suitable as second compound (B) are organic bases with pKa for the corresponding conjugated acid in the range of 15 to 50. It must be pointed out that, though the weak protogenicity of the polar aprotic solvents, some of these can be deprotonated by strong bases as shown on FIG. 1 and thus act both as solvents and acidic compound (A).

According to the present invention, the eluted solution is directly usable for a radiolabelling reaction, no evaporation for water elimination is required. Thus, the [18F] activity remains in solution at all times, contrary to the methods of prior art where it is recovered in a "dry form" on the surface of a reactor, as a result of the evaporation step.

According to the present invention, said elution step is performed by passing the eluting solution through a solid phase extraction column containing an anion-exchange resin. The [18F]fluoride is released from the resin in the eluting medium as specified above and is immediately usable for efficient radiolabelling, even at room temperature.

In some embodiments of the present invention, prior to the elution step, the column is rinsed with an organic solvent that allows the elimination of most of the residual water that may be undesirable for a subsequent chemical processing, i.e. nucleophilic substitution, whilst keeping the extracted anions trapped on the resin.

In some embodiments of the present invention, the solvent is heated up to enhance the water elimination.

In some embodiments of the present invention, this organic solvent can be selected among acetonitrile (ACN), dimethylsulfoxide (DMSO), dimethylacetamide, dimethylformamide (DMF), tetrahydrofuran (THF), diethylether, diisopropyl ether, di-tert-butyl ether, dioxane, ethyl acetate, acetone, isobutyronitrile, cyclopropyl cyanide, benzonitrile, pyridine, diethylcarbonate, sulfolane, hexamethylphosphotriamide (HMPA/HMPT), 1,3-Dimethyl-2-imidazolidinone (DMI), nitromethane, 3-methoxypropionitrile, n-butyronitrile, propionitrile, cyclopropylacetonitrile, trimethylacetonitrile, valeronitrile, methoxyacetonitrile, 1,4-dicyanobutane, glutaronitrile, 1,4-dicyanobutane, dimethylacetamide, methylcyanoacetate, nitromethane, toluene, ethylbenzene, xylenes, chlorobenzene, cyclohexane, etc., or any mix of several of these solvents.

In some embodiments of the present invention, this solvent is a non-polar organic solvent selected from the group consisting of pentane, hexane, heptane, octane, nonane, decane and cyclohexane.

In some embodiments of the present invention, prior to the elution step, a drying step comprising a flush of gas such as air, nitrogen or argon can be used to purge the column and eliminate most of the remaining solvent.

In some embodiments of the invention this drying step is assisted by heating up the anion-exchange resin directly or using the flushing gas or the organic solvent suitable for the subsequent radiolabelling reaction.

More specifically, according to the invention, the eluting medium is a low water content polar aprotic solvent containing a first compound (A) which is a molecule that contains at least one acidic hydrogen and a second compound (B) that is an organic base sufficiently strong to be able to tear off the acidic hydrogen of first compound (A) in an acid-base reaction to form an organic salt (S) which will act as an activating agent or phase transfer agent or phase transfer catalyst in the subsequent radiolabelling reaction. All these compounds are selected in such a way that it does not impact unfavorably on the yield of the subsequent labelling reaction. In this context, suitable compounds (B) are organic bases with pKa for the corresponding conjugated acid in the range of 15 to 50.

In some embodiments of the invention, the organic solvent used to elute the anion-exchange resin is preferably selected from the group consisting of acetonitrile (ACN), dimethylsulfoxide (DMSO), dimethylformamide (DMF), tetrahydrofuran (THF), diethylether, diisopropyl ether, di-tert-butyl ether, dioxane, ethyl acetate, acetone, isobutyronitrile, cyclopropyl cyanide, benzonitrile, pyridine, diethylcarbonate, sulfolane, hexamethylphosphotriamide (HMPA/HMPT), 1,3-Dimethyl-2-imidazolidinone (DMI), nitromethane, 3-methoxypropionitrile, n-butyronitrile, propionitrile, cyclopropylacetonitrile, trimethylacetonitrile, valeronitrile, methoxyacetonitrile, 1,4-dicyanobutane, glutaronitrile, 1,4-dicyanobutane, dimethylacetonitrile, methylcyanoacetate, nitromethane, toluene, ethylbenzene, xylenes, chlorobenzene, cyclohexane, etc., and any mix of several of these solvents.

In some embodiment of the invention this organic solvent suitable for the radiolabelling step contains at least one acidic hydrogen and thus, beside its role of organic solvent, has also the function of the first compound (A) of the present invention.

In some embodiments of the invention, the organic solvent used to elute the anion-exchange resin is an organic base sufficiently strong to be able to tear off the acidic hydrogen of compound (A) and thus beside its role of organic solvent, has also the function of the second compound (B) of the present invention.

In some embodiments of the present invention the eluting medium or the solid phase extraction column is heated up to enhance the elution efficiency.

In some embodiments of the invention the eluted medium is diluted in a solvent suitable for the labelling step such as acetonitrile (ACN), dimethylsulfoxide (DMSO), dimethylacetamide, dimethylformamide (DMF), tetrahydrofuran (THF), diethylether, diisopropyl ether, di-tert-butyl ether, dioxane, ethyl acetate, acetone, isobutyronitrile, cyclopropyl cyanide, benzonitrile, pyridine, diethylcarbonate, sulfolane, hexamethylphosphotriamide (HMPA/HMPT), 1,3-Dimethyl-2-imidazolidinone (DMI), nitromethane, 3-methoxypropionitrile, n-butyronitrile, propionitrile, cyclopropylacetonitrile, trimethylacetonitrile, valeronitrile, methoxyacetonitrile, 1,4-dicyanobutane, glutaronitrile, 1,4-dicyanobutane, dimethylacetonitrile, methylcyanoacetate, nitromethane, toluene, ethylbenzene, xylenes, chlorobenzene, cyclohexane, etc., and any mix of several of these solvents.

In some preferred embodiments of the invention the first compound (A) is identical to water. Water total content in the eluting solution must be however lower than 3% or 30000 ppm, preferably lower than 1.2% or 12000 ppm, more preferably in the range of 1000 ppm to 9000 ppm.

In some embodiments of the present invention, the first compound (A) used for the elution step is preferably selected from the group consisting of primary alcohols such as methanol, ethanol, n-propanol, n-butanol, amyl alcohol, n-hexyl alcohol, n-heptanol, benzyl alcohol or n-octanol, and secondary alcohols such as isopropanol, isobutanol, isoamyl alcohol or 3-pentanol.

In some embodiments of the present invention, the first compound (A) used for the elution process is preferably selected from the group consisting of tertiary alcohols, diols and polyols with 1 to 20 tertiary alcohol functions such as t-butanol, t-amyl alcohol, 2,3-dimethyl-2-butanol, 2-(trifluoromethyl)-2-propanol, 2,8-dimethyl-2,8-Decanediol or 2,5-dimethyl-3-Octyne-2,5-diol.

In this context, it has been shown by Kim et al [*A New Class of SN2 Reactions Catalyzed by Protic Solvents: Facile Fluorination for Isotopic Labeling of Diagnostic Molecules, J. Am. Chem. Soc.*, Vol. 128, 50 (2006) pp.16394-16397; WO-A-2006/065038] that the addition of some tertiary alcohols to the reaction mixtures subsequently to elution, usually composed of acetonitrile with the relevant precursor, does not impact unfavorably on the subsequent nucleophilic substitution reaction ("SN2" reactions).

In some embodiments of the present invention, the first compound (A) used for the elution process is preferably selected from the group consisting of aromatic alcohols such as phenols, with 1 to 20 phenol functions.

In some embodiments of the present invention, the first compound (A) used for the elution process is preferably selected in the group of carboxylic acids such as for example acetic acid, oxalic acid, citric acid, etc.

In some embodiments of the present invention, the second compound (B) is an organic base such as for example 2,4,6-Trimethylpyridine, 2,4,6-Collidine, 2-tert-Butyl-1,1,3,3-tetramethyl-guanidine (TBTMG or Barton base), 2-phenyl-1,1,3,3-tetramethylguanidine (PhTMG), 2,3,4,6,7,8,9,10-Octahydropyrimidol[1,2-a]azepine, 1,4-Diazabicyclo(2.2.2)octane (TED), Triethylenediamine, N,N-Dicyclohexylmethylamine, N,N-Diethylaniline, N,N-Diisopropyl-2-ethylbutylamine, 2,6-Di-tert-butyl-4-methylpyridine, N-Ethyldiisopropylamine, 2,6-Lutidine, 2,6-Dimethylpyridine, 7-Methyl-1,5,7-triazabicyclo(4.4.0)dec-5-ene (MTBD), 1,3,4,6,7,8-Hexahydro-1-methyl-2H-pyrimido[1,2-a]pyrimidine, 3,3,6,9,9-Pentamethyl-2,10-diazabicyclo-(4.4.0)dec-1-ene (PMDBD), 1,2,3,4,4a,5,6,7-Octahydro-2,2,4a,7,7-pentamethylnaphthyridine, 1,2,2,6,6-Pentamethylpiperidine (PMP), pempidine, 1,1,3,3-Tetramethylguanidine (TMG), N,N,N',N'-Tetramethyl-1,8-naphthalenediamine, 2,2,6,6-Tetramethylpiperidine (IMP), 1,5,7-Triazabicyclo(4.4.0)dec-5-ene, 1,3,4,6,7,8-Hexahydro-2H-pyrimido[1,2-a]pyrimidine (TBD), 2,4,6-Tri-tert-butylpyridine, Tris(trimethylsilyl)amine, Quinuclidine, 1,5,7-Triazabicyclo(4.4.0)dec-5-ene (TBD), 7-Methyl-1,5,7-triazabicyclo(4.4.0)dec-5-ene (MTBD), 1,8-Diazabicyclo[5.4.0]undec-7-ene (DBU), 1,5-Diazabicyclo[4.3.0]non-5-ene (DBN), 1,1,3,3-Quinuclidine, 2,2,6,6-Tetramethylpiperidine (TMP), Pempidine (PMP), Tributylamine, Triethylamine, 1,4-Diazabicyclo[2.2.2]octan (TED), 4-Dimethylaminopyridine (DMAP), 1,4-Diazabicyclo[2.2.2]octane (DABCO), 2,6-Lutidine, Pyridine (Py), alkylamines, dialkylamines, trialkylamines, sparteine, Diisopropylethylamine (Hünig's Base), proton sponges, bispidine, N,N'-Bn2-bispidine, N,N'-dimethyl-bispidine, N,N'—(CHMePh)-2-bispidine, N,N'-dimethyl-1,3-diaminopropane or N,N,N',N'-tetramethyl-1,3-diaminopropane.

In some embodiments of the present invention, the second compound (B) is preferably a phosphazene base such as 2-tert-Butylimino-2-diethylamino-1,3-dimethyl-perhydro-1,3,2-diazaphosphorine (Phosphazene base BEMP), tert-Butyl-imino-tris(dimethylamino)phosphorane (Phosphazene base PltBu), tert-Butylimino-tri(pyrrolidino)phosphorane (Phosphazene base BTPP) (P1-t-Bu-tris(tetramethylene)), 1,1,1,3,3,3-Hexakis(dimethylamino)diphosphazenium fluoride, N'-tert-Butyl-N,N,N',N',N'',N''-hexamethylphosphorimidic triamide (Phosphazene base P1-t-Bu), tert-Octyliminotris(dimethylamino)phosphorane (Phosphazene base P1-t-Oct), 1-Ethyl-2,2,4,4,4-pentakis(dimethylamino)-2Λ5,4Λ5-catenadi(phosphazene) (Phosphazene base P2-Et), 1-tert-Butyl-2,2,4,4,4-pentakis(dimethylamino)-2Λ5,4Λ5-catenadi(phosphazene) (Phosphazene base P2-t-Bu), 1-tert-Butyl-4,4,4-tris(dimethylamino)-2,2-bis[tris(dimethylamino)-phosphoranylidenamino]-2Λ5,4Λ5-catenadi(phosphazene) (Phosphazene base P4-t-Bu), 1-tert-Octyl-4,4,4-tris(dimethylamino)-2,2-bis[tris(dimethylamino)phosphoranylidenamino]-2Λ5,4Λ5-catenadi(phosphazene) (Phosphazene base P4-t-Oct), Tetrakis[tris(dimethylamino)phosphoranylidenamino]phosphonium fluoride (Phosphazene base P5-F), and 1,1,3,3,3-Pentakis(dimethylamino)-1Λ5,3Λ5-diphosphazene 1-oxide (Phosphazene base PDPO).

In some embodiments of the present invention, the second compound (B) is preferably a Verkade's base such as 2,8,9-Trimethyl-2,5,8,9-tetraaza-1-phosphabicyclo[3.3.3]undecane, 2,8,9-Triisopropyl-2,5,8,9-tetraaza-1-phosphabicyclo[3.3.3]undecane or 2,8,9-Triisobutyl-2,5,8,9-tetraaza-1-phosphabicyclo[3.3.3]undecane.

In some embodiments of the invention, the functionalities brought by the first compound (A) and the second compound (B) are on the same molecule, this molecule being used in the eluting solution.

In some embodiments of the present invention, the precursor for the labelling reaction is contained in the eluting solution.

The eluted organic solution containing the [18F]fluoride can be used for the synthesis of a PET radiotracer. The [18F] fluoride is then reactive, without any subsequent evaporation step, for substitution reactions on both aliphatic and aromatic precursors.

In some embodiments of the present invention, a suitable organic molecule containing an acidic hydrogen, i.e. a said first compound (A), identical to or different of the one used for the elution step can be added prior to labelling in the eluted [18F] fluoride solution to improve the radiolabelling yield.

To improve the labelling yield, in some preferred embodiments of the present invention, a suitable organic base, i.e. a said second compound (B), identical to or different of the one used for the elution step is added prior to labelling in the eluted [18F] fluoride solution or directly in the labelling medium.

DESCRIPTION OF A PREFERRED EMBODIMENT OF THE INVENTION

EXAMPLES

Elutions

1) QMA Elution

About 2 mCi of [18F]fluoride was trapped on a QMA cartridge (Waters, carbonates as counter ions).

The cartridge was rinsed with 2 mL of acetonitrile (water <1000 ppm).

An elution was performed with a solution containing 120 µL of DBU, 120 µL of water and 2 mL of ACN. 89% of the activity was eluted.

2) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 28 µL of BTPP and 1.5 mL of ACN (water content 10700 ppm). 92.5% of the activity was eluted.

3) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 26 µL of BEMP and 1.5 mL of ACN (water content 10700 ppm). 81% of the activity was eluted.

4) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 20 µL of Phosphazene base P2-Et and 1 mL of ACN (water content 10700 ppm). 96.5% of the activity was eluted.

5) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 90 µL of Phosphazene base P4-t-Bu and 1 mL of ACN (water content 9850 ppm). 97% of the activity was eluted.

6) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 15 µL of Verkade's base (2,8,9-Triisopropyl-2,5,8,9-tetraaza-1-phosphabicyclo[3.3.3]undecane) and 700 µL of ACN (water content 9975 ppm). 98.6% of the activity was eluted.

7) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 90 µL of Phosphazene base P4-t-Bu, 48 µL of dry ethanol and 1.2 mL of ACN (water content 300 ppm). 97% of the activity was eluted.

8) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 90 µL of Phosphazene base P4-t-Bu, 78 µL of dry phenol and 2 mL of ACN (water content 220 ppm). 65% of the activity was eluted.

9) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 30 µL of Phosphazene base P2-Et and 0.7 mL of ACN (water content 25000 ppm). 99.6% of the activity was eluted.

10) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 15 µL of Phosphazene base P2-Et and 1 mL of benzonitrile (water content 5900 ppm). 97% of the activity was eluted.

11) QMA Elution

About 2 mCi of [18F]fluoride was trapped on a QMA cartridge (Waters, carbonates as counter ions).

The cartridge was rinsed with 2 mL of dry acetonitrile (water <1000 ppm).

An elution was performed with a solution containing 15 µL of Phosphazene base P2-Et and 0.85 mL of DMSO (water content 25500 ppm). 95% of the activity was eluted.

12) QMA Elution

About 2 mCi of [18F]fluoride was trapped on a QMA cartridge (Waters, carbonates as counter ions).

The cartridge was rinsed with 2 mL of acetonitrile.

An elution was performed with a solution containing 120 µL of Phosphazene base P1-t-Bu, 120 mg of 2,8-dimethyl-2,8-Decanediol and 2 mL of ACN. 76% of the activity was eluted.

13) QMA Elution

About 2 mCi of [18F]fluoride was trapped on a QMA cartridge (Waters, carbonates as counter ions).

The cartridge was rinsed with 2 mL of acetonitrile.

An elution was performed with a solution containing 120 µL of Phosphazene base P4-t-Oct (1M in hexane) and 2 mL of ACN. 96% of the activity was eluted.

14) QMA Elution

About 2 mCi of [18F]fluoride was trapped on a QMA cartridge (Waters, carbonates as counter ions).

The cartridge was rinsed with 2 mL of acetonitrile.

An elution was performed with a solution containing 30 µL of Phosphazene base P2-Et and 1 mL of ACN containing 11 µl of water. 97.5% of the activity was eluted.

15) MAX Elution

About 2 mCi of [18F]fluoride was trapped on a MAX cartridge (Waters, carbonates as counter ions).

The cartridge was rinsed with 2 mL of dry acetonitrile (water <1000 ppm).

An elution was performed with a solution containing 15 µL of Phosphazene base P2-Et, and 2 mL of ACN (water content 5220 ppm). 95.6% of the activity was eluted.

Aliphatic Precursor Radiolabelling

16) QMA Elution+Mannose Triflate Radiolabelling

About 2 mCi of [18F]fluoride was trapped on a QMA cartridge (Waters, carbonates as counter ions).

The cartridge was rinsed with 2 mL of acetonitrile.

An elution was performed with a solution containing 120 µL of Phosphazene base P1-t-Bu, 120 µL of water and 0.5 mL of ACN. 98% of the activity was eluted.

This elution was followed by a labelling step (5 min, 85° C.) using 400 µL of the eluted fluoride, 1.5 mL of ACN and 40 mg of mannose triflate. The radioTLC labelling yield was 94%.

17) QMA Elution+Mannose Triflate Radiolabelling at RT

About 2 mCi of [18F]fluoride was trapped on a QMA cartridge (Waters, carbonates as counter ions).

The cartridge was rinsed with 2 mL of acetonitrile.

An elution was performed with a solution containing 15 µL of Phosphazene base P2-Et, and 1 ml of ACN (5300 ppm). 96% of the activity was eluted.

This elution was followed by a labelling step during 10 min at room temperature using 10 µL of the eluted fluoride, 0.5 mL of dry ACN, 7.5 µL of TBTMG and 20 mg of mannose triflate. The radio TLC labelling yield was of 76%. The radiochemical yield was 55% (end of bombardment) (EOB).

18) QMA Elution+Mannose Triflate Radiolabelling

About 1.5 mCi of [18F]fluoride was trapped on a QMA cartridge (Waters, carbonates as counter ions).

The cartridge was rinsed with 2 mL of dry acetonitrile (water content <1000 ppm).

An elution was performed with a solution containing 30 µL of Phosphazene base P2-Et, 1 mL of Toluene and 7500 ppm of MeOH. 93% of the activity was eluted.

This elution was followed by a labelling step during 5 min at 90° C. using 300 µl of the eluted fluoride, and 300 µl of dry ACN, 30 µL of TBTMG and 50 mg of mannose triflate. The radio TLC labelling yield was of 93%. The radiochemical yield was 90%.

19) QMA Elution+Mannose Triflate Radiolabelling

About 2 mCi of [18F]fluoride was trapped on a QMA cartridge (Waters, carbonates as counter ions).

The cartridge was rinsed with 2 mL of dry acetonitrile (water content <1000 ppm).

An elution was performed with a solution containing 30 µL of Phosphazene base P2-Et, and 2 ml of ACN (5300 ppm). 98% of the activity was eluted.

This elution was followed by a labelling step during 5 min at 90° C. using all the eluted fluoride, 1.5 mL of dry ACN, 30 µL of TBTMG and 50 mg of mannose triflate. After NaOH hydrolysis on tC18 and purification, 18F-FDG was obtained with a yield of 85% (EOB).

20) QMA Elution+2-(18F)fluoroethyl 4-methylbenzenesulfonate Synthesis

About 2 mCi of [18F]fluoride was trapped on a QMA cartridge (Waters, carbonates as counter ions).

The cartridge was rinsed with 2 mL of dry acetonitrile (water content <1000 ppm).

An elution was performed with a solution containing 15 µL of Phosphazene base P2-Et, and 1 ml of ACN (5300 ppm). 97% of the activity was eluted.

This elution was followed by a labelling step (5 min, 90° C.) using 200 µL of the eluted fluoride, 0.5 mL of dry ACN, 15 µL of TBTMG and 28 mg of diethylene glycol ditosylate. The radio TLC purity was of 93%. The 18F-fluoroethyl 4-methylbenzenesulfonate was obtained with a radiochemical yield of 91% (EOB).

Aromatic Precursor Radiolabelling 21) 4-[18F]fluorobenzaldehyde

About 4 mCi of [18F]fluoride was trapped on a QMA cartridge (Waters, carbonates as counter ions).

The cartridge was rinsed with 2 mL of dry acetonitrile (water content <1000 ppm).

An elution was performed with a solution containing 15 µL of Phosphazene base P2-Et, and 1 ml of sulfolane (6500 ppm). 95% of the activity was eluted.

This elution was followed by a labelling step (10 min, 140° C.) using all the eluted fluoride, 0.5 mL of dry sulfolane, 20 µL of TBTMG and 15 mg of 4-formyl-N,N,N-trimethyl benzenaminium trifluoromethane sulfonate. The radio TLC purity was of 93%. The 4-18F-fluorobenzaldehyde was obtained with a radiochemical yield of 80% (EOB).

22) 4-[18F]fluorobenzaldehyde

About 4 mCi of [18F]fluoride was trapped on a QMA cartridge (Waters, carbonates as counter ions).

The cartridge was rinsed with 2 mL of dry acetonitrile (water content <1000 ppm).

An elution was performed with a solution containing 15 µL of Phosphazene base P2-Et, and 1 ml of cyclopropyl cyanide (5500 ppm). 95% of the activity was eluted.

This elution was followed by a labelling step (10 min, 140° C.) using 100 µL of the eluted fluoride, 0.5 mL of dry cyclopropylcyanide, 15 µL of TBTMG and 15 mg of 4-formyl-N,N,N-trimethyl benzenaminium trifluoromethane sulfonate. The radio TLC purity was of 82%. The 4[18F]fluorobenzaldehyde was obtained with a radiochemical yield of 75% (EOB).

23) 6-[18F]fluoropiperonal

About 5 mCi of [18F]fluoride was trapped on a QMA cartridge (Waters, carbonates as counter ions).

The cartridge was rinsed with 2 mL of dry acetonitrile (water content <1000 ppm).

An elution was performed with a solution containing 15 µL of Phosphazene base P2-Et, and 1 ml of cyclopropyl cyanide (5500 ppm). 92% of the activity was eluted.

This elution was followed by a labelling step (10 min, 140° C.) using 15 µL of the eluted fluoride, 0.5 mL of dry DMSO, 15 µL of TBTMG and 18 mg of 6-nitropiperonal. The 6-[18F] fluoropiperonal TLC purity was of 61% and the radiochemical yield of 51% (EOB).

The invention claimed is:

1. A method to extract out of an aqueous solution, concentrate and/or reformulate [18F] fluorides without any evaporation step, in an organic solution suitable for a subsequent radiolabelling reaction, said method comprising the following steps of:

passing said aqueous [18F] fluoride solution through a solid phase extraction column containing an anion-exchange resin so that said [18F] fluorides are trapped on said resin;

eluting said [18F] fluorides with an eluting solution to release said [18F] fluorides from said anion-exchange resin under a form which is reactive and immediately usable for a labelling reaction;

using the eluted solution for a radiolabelling reaction;

wherein the eluting solution is an organic solution with water content <3%, containing at least the following components:

a polar aprotic organic solvent;

a first compound (A) which is a molecule containing at least one acidic hydrogen; and a second compound (B) which is an organic base sufficiently strong to be able to tear off the acidic hydrogen of the first compound (A) in an acid-base reaction leading to the formation of an organic salt (S).

2. Method according to claim 1, wherein, prior to the elution step, the column is rinsed with an organic solvent for eliminating the residual water that may be undesirable for a subsequent chemical processing, while keeping the extracted anions trapped on the resin.

3. Method according to claim 2, wherein the organic solvent used to rinse the column is selected from the group consisting of: acetonitrile (ACN), dimethylsulfoxide (DMSO), dimethylacetamide, dimethylformamide (DMF), tetrahydrofuran (THF), diethylether, diisopropyl ether, di-tert-butyl ether, dioxane, ethyl acetate, acetone, isobutyronitrile, cyclopropyl cyanide, benzonitrile, pyridine, diethylcarbonate, sulfolane, hexamethylphosphotriamide (HMPA/HMPT), 1,3-Dimethyl-2-imidazolidinone (DMI), nitromethane, 3-methoxypropionitrile, n-butyronitrile, propionitrile, cyclopropylacetonitrile, trimethylacetonitrile, valeronitrile, methoxyacetonitrile, 1,4-dicyanobutane, glutaronitrile, 1,4-dicyanobutane, dimethylacetonitrile, methylcyanoacetate, nitromethane, toluene, ethylbenzene, xylenes, chlorobenzene, pentane, hexane, heptane, octane, nonane, decane, cyclohexane, and any mix of several of these solvents.

4. Method according to claim 1, wherein, prior to the elution step, a drying step comprising a flush of gas such as air, nitrogen, helium or argon, is used to purge the column and eliminate most of the remaining solvent.

5. Method according to claim 4, wherein said drying step is assisted by heating up the anion-exchange resin directly or using the flushing gas or said organic elution solvent.

6. Method according to claim 1, wherein the organic solvent used in the elution of the anion exchange resin is selected from the group consisting of: acetonitrile (ACN), dimethylsulfoxide (DMSO), dimethylacetamide, dimethylformamide (DMF), tetrahydrofuran (THF), diethylether, diisopropyl ether, di-tert-butyl ether, dioxane, ethyl acetate, acetone, isobutyronitrile, cyclopropyl cyanide, benzonitrile, pyridine, diethylcarbonate, sulfolane, hexamethylphosphotriamide (HMPA/HMPT), 1,3-Dimethyl-2-imidazolidinone (DMI), nitromethane, 3-methoxypropionitrile, n-butyronitrile, propionitrile, cyclopropylacetonitrile, trimethylacetonitrile, valeronitrile, methoxyacetonitrile, 1,4-dicyanobutane, glutaronitrile, 1,4-dicyanobutane, dimethylacetonitrile, methylcyanoacetate, nitromethane, toluene, ethylbenzene, xylenes, chlorobenzene, cyclohexane, and any mix of several of these solvents.

7. Method according to claim 1, wherein the eluted solution is diluted in a polar aprotic organic solvent selected from the group consisting of: acetonitrile (ACN), dimethylsulfoxide (DMSO), dimethylacetamide, dimethylformamide (DMF), tetrahydrofuran (THF), diethylether, diisopropyl ether, di-tert-butyl ether, dioxane, ethyl acetate, acetone, isobutyronitrile, cyclopropyl cyanide, benzonitrile, pyridine, diethylcarbonate, sulfolane, hexamethylphosphotriamide (HMPA/HMPT), 1,3-Dimethyl-2-imidazolidinone (DMI), nitromethane, 3-methoxypropionitrile, n-butyronitrile, propionitrile, cyclopropylacetonitrile, trimethylacetonitrile, valeronitrile, methoxyacetonitrile, 1,4-dicyanobutane, glutaronitrile, 1,4-dicyanobutane, dimethylacetonitrile, methylcyanoacetate, nitromethane, toluene, ethylbenzene, xylenes, chlorobenzene, cyclohexane, and any mix of several of these solvents.

8. Method according to claim 1, wherein the first compound (A) is water.

9. Method according to claim 1, wherein the first compound (A) used in the elution step is selected from the group consisting of: primary alcohols such as methanol, ethanol, n-propanol, n-butanol, amyl alcohol, n-hexyl alcohol, n-heptanol, benzyl alcohol or n-octanol, and secondary alcohols such as isopropanol, isobutanol, isoamyl alcohol or 3-pentanol.

10. Method according to claim 1, wherein the first compound (A) used in the elution step is selected from the group consisting of: tertiary alcohols, diols and polyols with 1 to 20 tertiary alcohol functions such as t-butanol, t-amyl alcohol, 2,3-dimethyl-2-butanol, 2-(trifluoromethyl)-2-propanol, 2,8-dimethyl-2,8-Decanediol or 2,5-dimethyl-3-Octyne-2,5-diol.

11. Method according to claim 1, wherein that the first compound (A) used in the elution step is selected from the group consisting of: carboxylic acids such as acetic acid, oxalic acid or citric acid.

12. Method according to claim 1, wherein the second compound (B) is an organic base having a pKa of its corresponding conjugated acid comprising between 15 and 50.

13. Method according to claim 1, wherein the second compound (B) is an organic base selected from the group consisting of: 2,4,6-Trimethylpyridine, 2,4,6-Collidine, 2-tert-Butyl-1,1,3,3-tetramethyl-guani-dine (TBTMG), 2-phenyl-1,1,3,3-tetramethylguanidine (PhTMG), 2,3,4,6,7,8,9,10-Octahydropyrimidol[1,2-a]azepine, Triethylenediamine (TED), N,N-Dicyclohexylmethylamine, N,N-Diethylaniline, N,N-Diiso-propyl-2-ethylbutylamine, 2,6-Di-tert-butyl-4-methyl-pyridine, N-Ethyldiisopropylamine, 2,6-Lutidine, 2,6-Dimethylpyridine, 7-Methyl-1,5,7-triazabicyclo(4.4.0) dec-5-ene (MTBD), 1,3,4,6,7,8-Hexahydro-1-methyl-2H-pyrimido [1,2-a]pyrimidine, 3,3,6,9,9-Pentamethyl-2,10-di-azabi-cyclo-(4.4.0)dec-1-ene (PMDBD), 1,2,3,4,4a,5,6,7-Octahydro-2,2,4a,7,7-pentamethylnaphthyridine, 1,2,2,6,6-Penta-methylpiperidine, 1,1,3,3-Tetramethyl-guanidine (TMG), N,N,N,'N'-Tetramethyl-1,8-naphthalene-diamine, 2,2,6,6-Tetramethylpiperidine (TMP), 1,5,7-Triazabicyclo (4.4.0)dec-5-ene, 1,3,4,6,7,8-Hexahydro-2H-pyrimido[1,2-a]pyrimidine (TBD), 2,4,6-Tri-tert-butyl-pyridine, Tris(trimethylsilyl)amine, Quinuclidine, 1,8-Diazabi-cyclo[5.4.0] undec-7-ene (DBU), 1,5-Diazabicyclo[4.3.0]non-5-ene (DBN), Pempidine (PMP), Tributylamine, Triethylamine, 4-Dimethylaminopyridine (DMAP), 1,4-Diazabicyclo [2.2.2]octane (DABCO), 2,6-Lutidine, Pyridine (Py), alkylamines, dialkylamines, trialkylamines, sparteine, Diisopropylethylamine (Hünig's Base), proton sponges, bispidine, N,N'-Bn2-bispidine, N,N'-dimethyl-bispidine, N,N'-(CHMePh)2-bispidine, N,N'-dimethyl-1,3-diaminopropane, N,N,N'N'-tetramethyl-1,3-diaminopropane, 2-tert-Butyl-imino-2-diethylamino-1,3-dimethyl-perhydro-1,3,2-diazaphosphorine (Phosphazene base BEMP), tert-Butyl-imino -tris(dimethylamino)phosphorane (Phosphazene base P1tBu), tert-Butylimino-tri(pyrrolidino)phosphorane (Phosphazene base BTPP) (P1-t-Bu-tris(tetramethylene)), 1,1,1,3,3,3-Hexakis (dimethylamino)diphosphazenium fluoride, N'-tert-Butyl-N,N,N',N',N'',N''-hexamethylphosphorimidic triamide (Phosphazene base P1-t-Bu), tert-Octylimino-tris (dimethylamino)phosphorane (Phosphazene base P1-t-Oct), 1-Ethyl-2,2,4,4,4-pentakis(dimethylamino)-2L5,4L5-catenadi(phosphazene)(Phosphazene base P2-Et), 1-tert -Butyl-2,2,4,4,4-pentakis(dimethylamino)-2L5,4L5-catenadi(phosphazene)(Phosphazene base P2-t-Bu), 1-tert-Butyl-4,4,4-tris (dimethylamino)-2,2-bis[tris(dimethylamino) -phosphoranylidenamino]-2Λ5,4Λ5-catenadi(phosphazene) (Phosphazene base P4-t-Bu), 1-tert -Octyl-4,4,4-tris(dimethylamino)-2,2-bis[tris(dimethylamino)phosphoranylidenamino]-2Λ5,4Λ5-catenadi(phosphazene) (Phosphazene base P4-t-Oct), Tetrakis[tris(dimethylamino)phosphoranylidenamino]phosphonium fluoride (Phosphazene base P5-F), 1,1,3,3,3-Pentakis(dimethylamino)-1λ5,3λ5-diphosphazene 1-oxide (Phosphazene base PDPO), 2,8,9-Trimethyl-2,5,8,9-tetraaza-1-phosphabicyclo[3.3.3]undecane, 2,8,9-Triisopropyl-2,5,8,9-tetraaza-1-phosphabicyclo[3.3.3] undecane, and 2,8,9-Triisobutyl-2,5,8,9-tetraaza-1-phosphabicyclo[3.3.3]undecane.

14. Method according to claim 1, wherein the functionalities brought by the first compound (A) and the second compound (B) are on the same molecule, the same molecule being used in the eluting solution.

15. Method according to claim 1, wherein the eluted organic solution containing the [18F] fluoride is used for the synthesis of a PET radiotracer, without any subsequent evaporation step, the [18F] fluoride being then reactive for substitution reactions on both aliphatic and aromatic precursors.

16. Method according to claim 15, wherein, in some specific labelling reactions, a suitable organic base identical to or different of the second compound (B) used for the elution step is added prior to labelling in the eluted [18F] fluoride solution to improve the radiolabelling yield.

17. Method according to claim 16, wherein, in some specific labelling reactions, a suitable organic molecule containing an acidic hydrogen identical to or different of the first compound (A) used for the elution step is added prior to labelling in the eluted [18F] fluoride solution to improve the labelling yield.

\* \* \* \* \*

UNITED STATES PATENT AND TRADEMARK OFFICE
CERTIFICATE OF CORRECTION

PATENT NO. : 8,491,790 B2
APPLICATION NO. : 12/664615
DATED : July 23, 2013
INVENTOR(S) : Lemaire et al.

Page 1 of 1

It is certified that error appears in the above-identified patent and that said Letters Patent is hereby corrected as shown below:

In the Specification

Col. 4, line 32: "(DMSO), dimethylformamide (DMF)," should read --(DMSO), dimethylacetamide, dimethylformamide (DMF),--

Signed and Sealed this
Twenty-fourth Day of June, 2014

Michelle K. Lee
*Deputy Director of the United States Patent and Trademark Office*